Jan. 20, 1953     C. H. VAN ORDEN     2,625,852
REFLECTING LIGHT RAY SCREEN SYSTEM
Filed Jan. 13, 1950     3 Sheets-Sheet 1
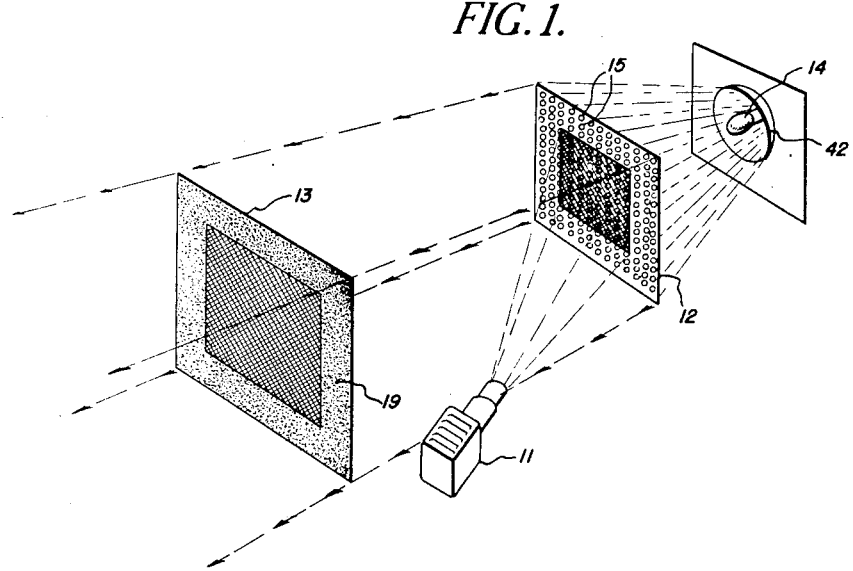
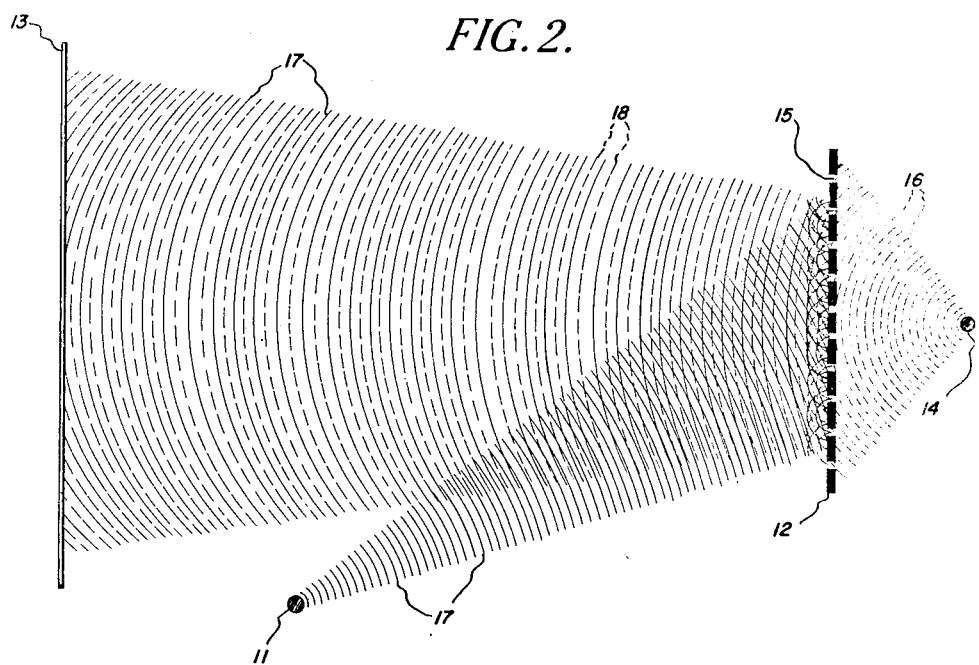
Inventor
CLARENCE H. VAN ORDEN
By McMorrow, Berman & Davidson
Attorneys Jan. 20, 1953     C. H. VAN ORDEN     2,625,852
REFLECTING LIGHT RAY SCREEN SYSTEM
Filed Jan. 13, 1950     3 Sheets—Sheet 2

Inventor
CLARENCE H. VAN ORDEN
By McMorrow, Berman & Davidson
Attorneys

Jan. 20, 1953  C. H. VAN ORDEN  2,625,852
REFLECTING LIGHT RAY SCREEN SYSTEM
Filed Jan. 13, 1950  3 Sheets-Sheet 3

Inventor
CLARENCE H. VAN ORDEN

By
McMorrow, Berman & Davidson
Attorneys

Patented Jan. 20, 1953

2,625,852

UNITED STATES PATENT OFFICE 2,625,852

REFLECTING LIGHT RAY SCREEN SYSTEM

Clarence H. Van Orden, Newark, N. J.

Application January 13, 1950, Serial No. 138,409

4 Claims. (Cl. 88—24)

This invention relates to light reflecting screens, and more particularly to a light reflecting screen provided with means for adding desired quantities of additional light to that which is reflected from the screen.

A main object of the invention is to provide a novel and improved light ray reflecting screen device which is very simple in construction, which involves very few components, and which provides a means of adding desired quantities and color components to the light which is reflected from the screen, whereby the contrast and the color composition of an image reflected from the screen can be readily controlled.

A further object of the invention is to provide an improved reflecting light ray screen device which is very inexpensive, which is easily controllable as to the degree of contrast of an image reflected therefrom, and which provides a simple and effective means of adding to the total light intensity of a projected image and of adding desired color values to the image.

Further objects and advantages of the invention will become apparent from the following description and claims, and from the accompanying drawings, wherein:

Figure 1 is a perspective view of a reflecting screen arrangement according to the present invention, indicating the manner in which a reflection is combined with direct light filtered through the screen element of the device by means of openings within the screen element, the supplemental light source at the rear of the screen also being indicated;

Figure 2 is a diagram illustrating the principle employed in the system of the present invention, wherein reinforcing light is added to the light reflected from the screen element;

Figure 3:
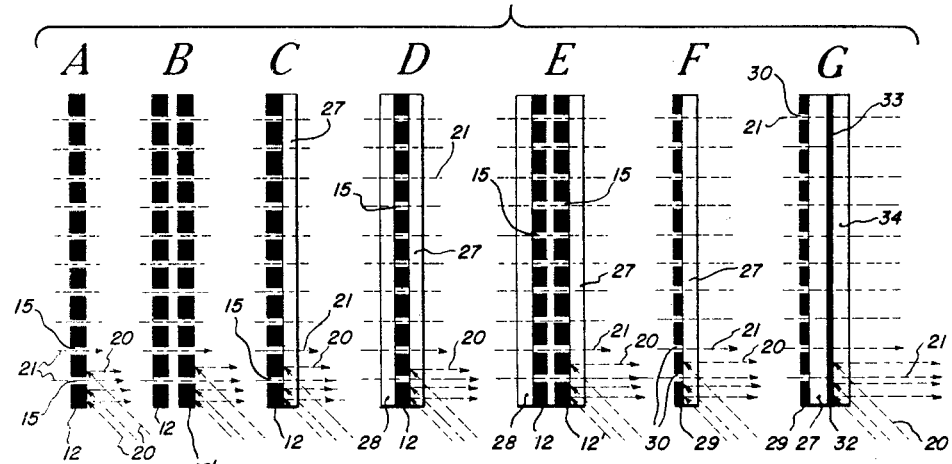
Figure 4:
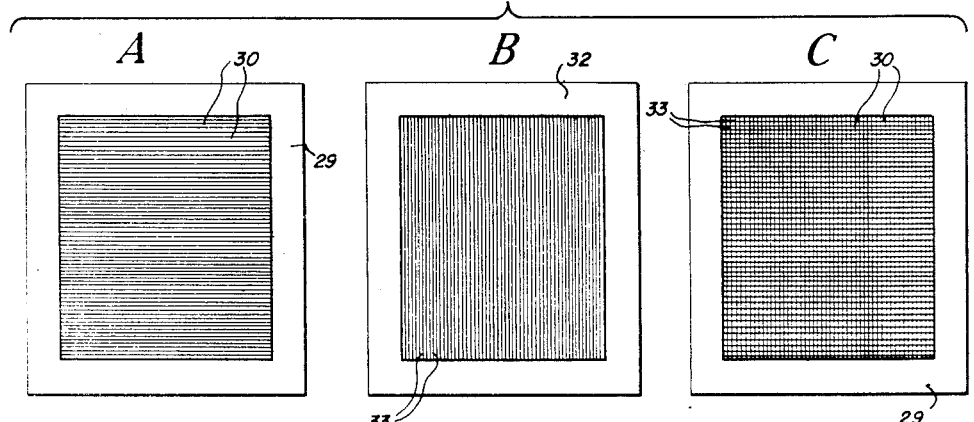
Figure 6:
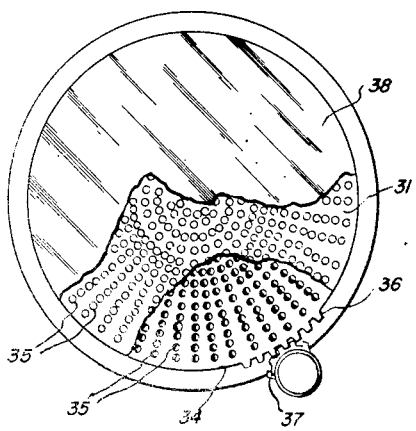
Figure 5:
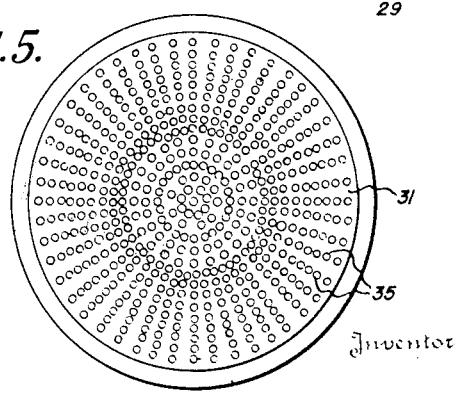
Figure 7:
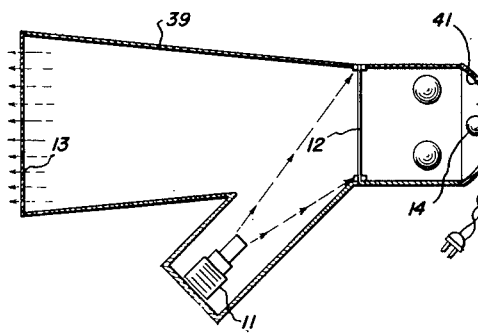
Figure 8:
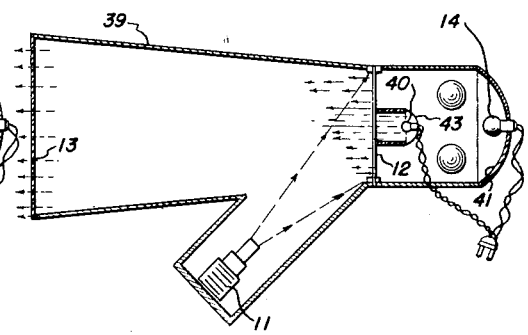
Figure 9:
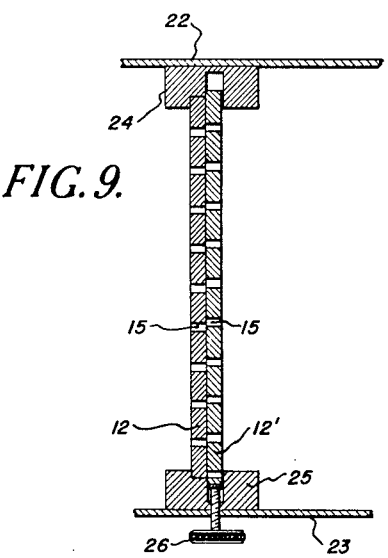
Figure 10:
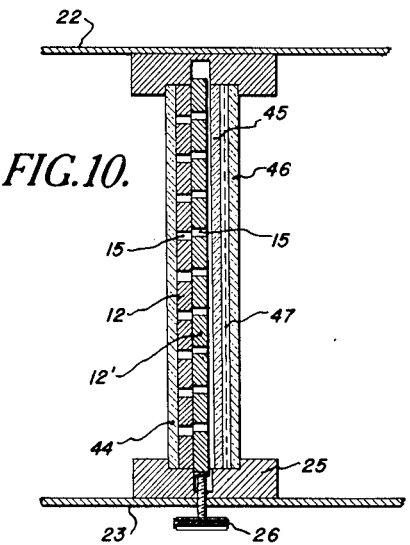
Figure 11:
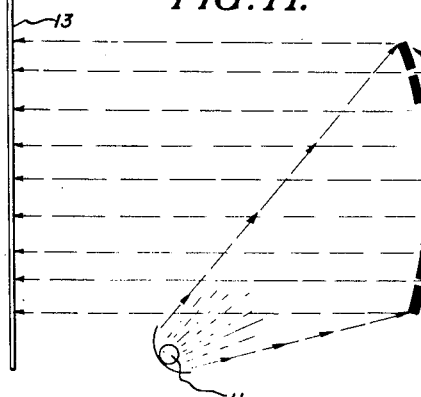

Figure 3 comprises a group of enlarged, fragmentary, cross-sectional detail views taken through various apertured screen devices employed in accordance with the present invention;

Figure 4 illustrates a group of screen elements wherein slits are employed for the passage of light therethrough, the elements being employed in any one of several different ways to control the amount of light passing through the screen portion of the system;

Figure 5 is a front elevational view showing an apertured, circular screen constructed in accordance with the present invention;

Figure 6 is a front elevational view, partly broken away, showing a variable screen arrangement employing the circular, apertured screen of Figure 5;

Figure 7 is a vertical, longitudinal, cross-sectional view taken through a light reflecting arrangement according to the present invention, wherein the various components are mounted in a housing;

Figure 8 is a vertical, longitudinal, cross-sectional view similar to Figure 7, but showing a modification wherein a supplemental light source is mounted behind the central portion of the apertured light reflecting screen;

Figure 9 is an enlarged, vertical, transverse, cross-sectional detail view taken through a variable screen element employed in a system according to the present invention, showing means for adjusting the amount of reinforcing light furnished through the screen;

Figure 10 is a view similar to Figure 9, but showing a modified form of adjustable reflecting screen;

Figure 11 is a diagram of a light reflecting system according to the present invention employing a curved, apertured screen.

Referring to the drawings, and more particularly to Figures 1 and 2, the system of the present invention comprises basically a light projection device 11 which is directed toward a light-reflective screen element 12, which may have a suitable reflective surface, such as a polished, plated or mirror surface. Designated at 13 is a translucent viewing screen, of ground glass or the like, positioned to receive the light rays reflected from the reflective element 12. Positioned behind the element 12 is a light source 14. The element 12 is formed with small apertures 15 distributed uniformly over its area through which light from source 14 passes and reinforces the light from projector 11 reaching the viewing screen 13. The contrast of a black-and-white image projected by element 11 and reaching the viewing screen 13 may thus be reduced to a desired value by adding light from the supplemental source 14. The source 14 may be also employed to add colored light to the image reaching screen 13, providing an over-all colored tint to the picture viewed on said screen. In this case, the lamp 14 may be of a type which emits the desired color, or a suitably colored filter may be interposed between the light source 14 and the apertured screen element 12.

If so desired, the source 14 may be an ultraviolet lamp, whereby ultraviolet radiation will be added to the light reaching the viewing screen 13. The ultraviolet radiation may be employed to provide special optical effects or for germicidal and therapeutic purposes. When such an arrangement is desired, the screen 13 is preferably made of quartz glass or other suitable material transparent to ultraviolet radiation.

Figure 2 illustrates the light wave fronts from the projector 11, illustrated by the concentric arcs 17, reflected from the reflective screen element 12, and traveling toward the viewing screen 13. The original wave fronts of radiant energy from the supplemental source 14 are shown by the concentric arcs 16. New supplemental wave fronts 18 are derived at the apertures 15, which combine with the reflected main wave fronts 17, the resultant combined radiant energy impinging on the receiving screen 13 in the manner illustrated in Figure 2.

As shown in Figure 1, the picture projected by projector 11 may occupy the central portion of the viewing screen 13 and the supplemental light source 14 may provide an illuminated margin 19 around the picture on the viewing screen.

The distance between the viewing screen 13 and the reflecting screen 12 is variable, and may be arranged in accordance with the intensity of the beam from the projection unit 11, the reflectivity of the screen element 12 and the desired size of the image on the viewing screen.

Referring now to Figure 3, "A" is an enlarged, vertical, cross-sectional view taken through a portion of the apertured screen element 12 of Figure 1, showing light rays 20 from the projector 11 being reflected from the screen element 12 and showing supplemental light rays 21 from the reinforcing light source 14 passing through the apertures 15, and joining the reflected light rays 20. "B" illustrates an arrangement of two screen elements 12, 12', which are supported in spaced parallel relation and which have registrable apertures 15 through which the supplemental light rays 21 may pass. By shifting the position of one of the screen elements relative to the other, the degree of registry of the apertures 15 may be varied, thereby varying the amount of supplemental light passing through the screen elements.

Figure 9 is a cross-sectional view taken through a practical embodiment of the arrangement of Figure 3 "B." In Figure 9, 22 and 23 designate respective top and bottom horizontal supporting walls to which are secured the respective channeled brackets 24 and 25. Rigidly secured in said brackets is the apertured element 12 and slidably supported in the brackets for vertical movement is the other apertured element 12'. Threaded through the bottom wall 23 is a thumbscrew 26 which engages the bottom edge of screen element 12'. As shown in Figure 9, the degree of registry of the apertures 15 in the respective elements 12 and 12' may be regulated by rotating the thumbscrew 26.

In Figure 3, "C" designates an arrangement similar to "A," but wherein a layer of transparent material 27 is disposed adjacent the reflecting face of the screen element 12. "D" illustrates an arrangement similar to "C," but wherein another layer of transparent material 28 is disposed behind the screen element 12. "E" illustrates an arrangement similar to "B," but wherein the transparent layer 27 is disposed forwardly adjacent the reflecting screen element 12' and the other transparent layer 28 is disposed rearwardly adjacent the screen element 12.

In Figure 3, "F" illustrates an enlarged, vertical, cross-section taken through a portion of a reflective screen, such as is shown at 29 in Figure 4 "A." The screen 29 is formed with evenly spaced, horizontal slits 30. In Figure 3 "F," a layer of transparent material 27 is disposed forwardly adjacent the screen 29.

Figure 3 "F" is similar in appearance to a vertical, cross-sectional view taken through a portion of the apertured disc element 31 shown in Figure 5.

In Figure 3, "G" illustrates an enlarged, vertical, cross-sectional view taken through a portion of the screen arrangement shown in Figure 4 "C," wherein an element 32 having vertical slits 33 is disposed forwardly adjacent the arrangement of Figure 3 "F," and another layer of transparent material 34 is disposed forwardly adjacent the element 32. As shown in Figure 3 "G," the light rays 20 are reflected from the front face of element 32 and the reinforcing supplemental rays 21 pass through the intersections of the slits 30 and 33.

Figure 6 illustrates an arrangement which may be employed as a reflective screen unit in place of the screen 12 in Figure 1, the screen unit comprising a stationary, apertured disc 31 and a rotatable apertured disc 34 coaxially mounted adjacent the disc 31 and the apertures 35 of the respective discs being registrable. The periphery of the rotatable disc 34 is formed with rack teeth 36. Meshing with said rack teeth is a rack gear 37 rotatably mounted in any suitable manner adjacent the discs. By manually rotating the gear 37, the disc 34 may be rotated to vary the degree or registration of the apertures 35 of the respective discs. Stationary discs of transparent material 38 may be disposed adjacent the front and rear faces of the screen unit, as in Figure 3 "E."

Figure 7 illustrates an arrangement wherein the elements of Figure 1 are mounted in a suitable housing 39.

Figure 8 illustrates an arrangement similar to Figure 7, but wherein an additional reinforcing source 40 is disposed behind the central portion of the apertured reflective screen element 12. Source 40 is employed either to provide a central core of higher intensity to reinforce the light reflected from screen 12, to introduce colored light into the central portion of the resultant beam reaching screen 13, or both.

It will be noted from Figures 7 and 8 that the housing 39 includes a reflector portion 41 behind the supplementary light source 14 corresponding to the reflector indicated at 42 in Figure 1. A similar reflector 43 is provided behind the central supplementary light source 40 in Figure 8.

Figure 10 illustrates a two-screen arrangement similar to Figure 9, wherein a layer of transparent material 44 is disposed forwardly adjacent the reflective screen element 12, and wherein spaced transparent layers 45 and 46 are disposed behind the adjustable screen element 12'. A layer of transparent colored material 47 is disposed between the transparent layers 45 and 46, causing the light transmitted through the screen unit to be tinted the same color as layer 47.

As shown in Figure 11, the apertured reflective screen, designated generally at 48, may be curved instead of plane, causing the reflected beam to be more concentrated than in the previously described forms of the invention. The arrangement of Figure 11 is useful for providing desired lighting effects at a substantial distance from the light sources. The curved screen unit 48 may be of a variable-aperture type similar to the variable-aperture units disclosed above.

While certain specific embodiments of light reflecting and image reinforcing systems have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a picture projection system of the character described, a housing, a reflective member located in said housing and comprising a first opaque element formed of closely spaced horizontal slits and a second opaque element disposed adjacent said first element and formed with closely spaced vertical slits, a picture projecting means in the housing located forwardly of the member and directed toward said member, whereby light rays from said picture projecting means will be reflected forwardly from the member, a light source in the housing located behind the member and directed through said member, whereby light rays from said light source will pass through said slits and combine with the reflected rays from the picture projecting means, and a translucent viewing screen in said housing located forwardly of said member in the path of the combined light rays.

2. In a picture projecting system, an upstanding mirror reflective screen member provided with a plurality of spaced apertures extending therethrough and over its entire area, an upstanding diffusing and translucent viewing screen arranged parallel with and on one side of and facing one face of said screen member and spaced from the latter, a light source arranged on the other side of and facing the other face of said screen member and spaced from the latter, a reflector projecting the light from said light source toward said other face of said screen member, and a picture projection device arranged intermediate and laterally spaced on one side of said viewing screen and screen member and directed toward said one face of said screen member, whereby the light from the light source passes through the apertures in the screen member onto the viewing screen to thereby produce the desired contrast in the projected picture.

3. In a picture projecting system, an upstanding mirror reflective screen member provided with a plurality of spaced apertures extending therethrough and over its entire area and having a layer of transparent material disposed adjacent one face thereof, an upstanding diffusing and translucent viewing screen arranged parallel with and on one side of and facing one face of said screen member and spaced from the latter, a light source arranged on the other side of and facing the other face of said screen member and spaced from the latter, a reflector projecting the light from said light source toward said other face of said screen member, and a picture projection device arranged intermediate and laterally spaced on one side of said viewing screen and screen member and directed toward said one face of said screen member, whereby the light from the light source passes through the apertures in the screen member onto the viewing screen to thereby produce the desired contrast in the projected picture.

4. In a picture projecting system, an upstanding screen member embodying a pair of screen elements arranged in closely adjacent and parallel relationship, one of said elements being movable relative to the other, each of said elements having a plurality of spaced apertures extending therethrough and over its entire area, an upstanding diffusing and translucent viewing screen arranged parallel with and on one side of and facing one face of said screen member and spaced from the latter, the surface of said screen member which faces said viewing screen being a mirror surface, a light source arranged on the other side of and facing the other face of said screen member and spaced from the latter, a reflector projecting the light from said light source toward said other face of said screen member, and a picture projection device arranged intermediate and laterally spaced on one side of said viewing screen and screen member and directed toward said one face of said screen member, whereby the light from the light source passes through the apertures in the screen member onto the viewing screen to thereby produce the desired contrast in the projected picture.

CLARENCE H. VAN ORDEN.

REFERENCES CITED

The following references are of record in the file of this patent:

UNITED STATES PATENTS

| Number | Name | Date |
| --- | --- | --- |
| 1,104,407 | Cary | July 21, 1914 |
| 1,808,743 | Barkelew | June 9, 1931 |
| 1,821,626 | Fleischer | Sept. 1, 1931 |
| 2,029,300 | Arfsten | Feb. 4, 1936 |
| 2,117,857 | Schlanger et al. | May 17, 1938 |
| 2,148,260 | Comparato | Feb. 21, 1939 |
| 2,218,875 | Parsell | Oct. 22, 1940 |
| 2,334,962 | Seitz | Nov. 23, 1943 |
| 2,336,508 | Smith et al. | Dec. 14, 1943 |
| 2,380,241 | Jelley et al. | July 10, 1945 |

FOREIGN PATENTS

| Number | Country | Date |
| --- | --- | --- |
| 937,781 | France | Apr. 26, 1948 |